H. A. LANDIS.
COMBINED INDICATOR AND RECORDER.
APPLICATION FILED MAY 24, 1916.

1,235,334.

Patented July 31, 1917.
3 SHEETS—SHEET 1.

Witness
C. H. Wagner

Inventor
H. A. Landis
By Robert Robb
Attorneys

H. A. LANDIS.
COMBINED INDICATOR AND RECORDER.
APPLICATION FILED MAY 24, 1916.
1,235,334.
Patented July 31, 1917.
3 SHEETS—SHEET 2.
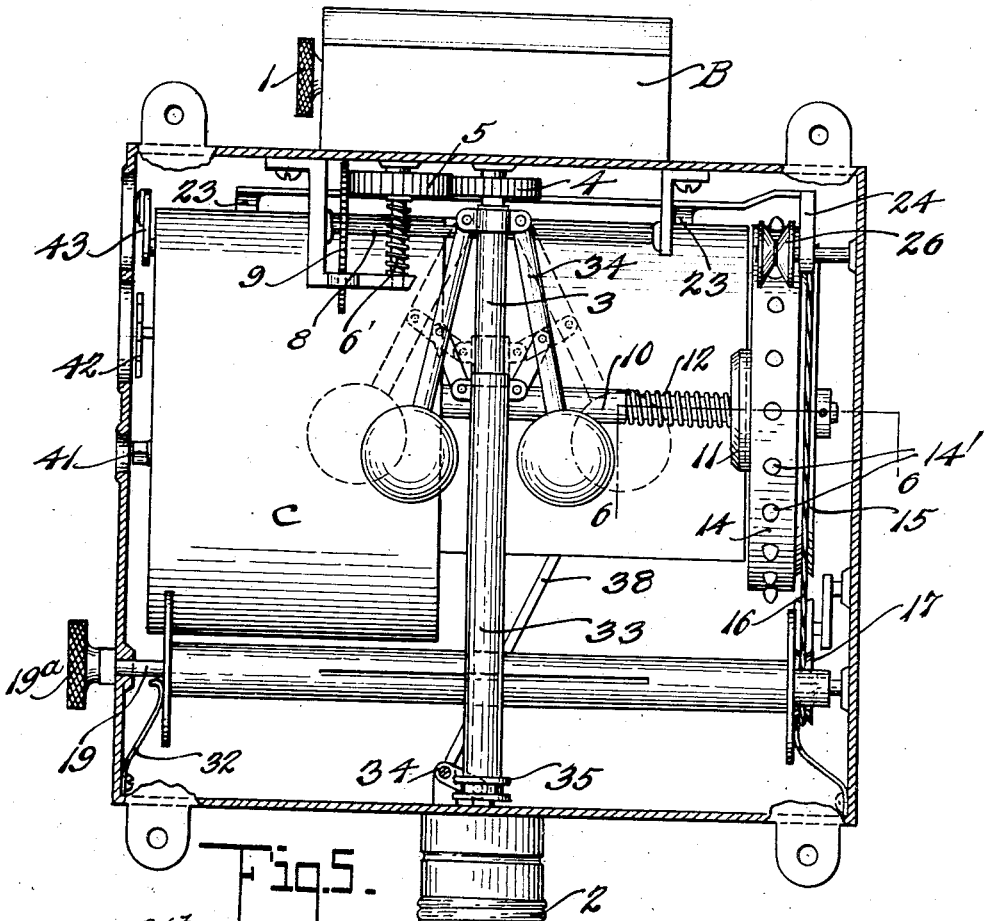
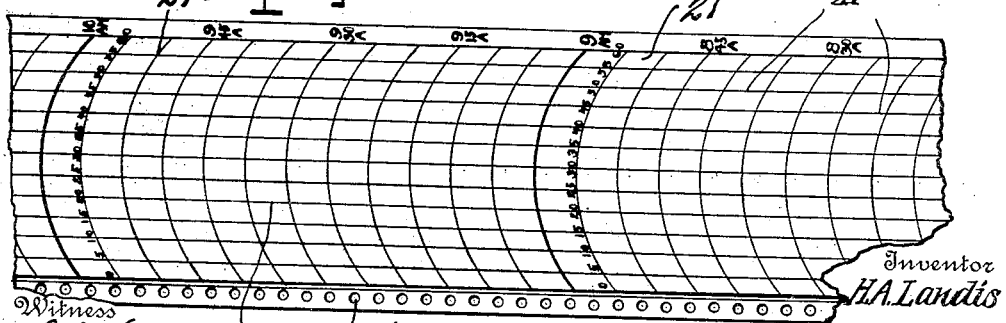
Witness
C. H. Wagner.
Inventor
H. A. Landis
By Robb & Robb
Attorneys

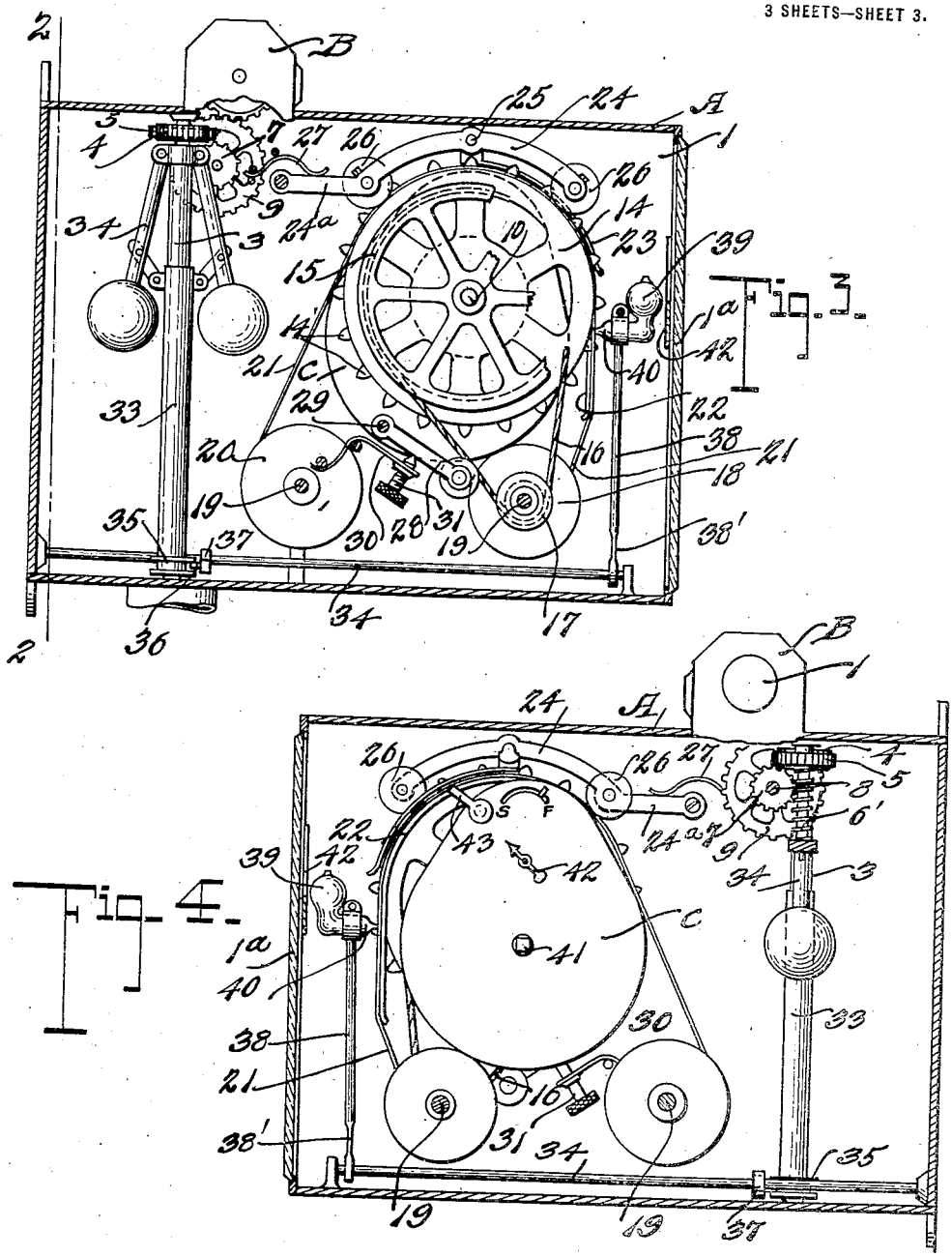

UNITED STATES PATENT OFFICE.

HARRY A. LANDIS, OF RALEIGH, NORTH CAROLINA.

COMBINED INDICATOR AND RECORDER.

1,235,334.

Specification of Letters Patent. Patented July 31, 1917.

Application filed May 24, 1916. Serial No. 99,676.

*To all whom it may concern:*

Be it known that I, HARRY A. LANDIS, a citizen of the United States, residing at Raleigh, in the county of Wake and State of North Carolina, have invented certain new and useful Improvements in Combined Indicators and Recorders, of which the following is a specification.

This invention involves improvements in that type of indicating and recording instruments designed particularly for the purpose of indicating the speed of operation of a vehicle, registering the mileage which the vehicle may travel, and for making a permanent record of said mileage in association with time indicia whereby the speed of the vehicle at any predetermined time during its use may be determined.

An essential object of the invention has been to simplify the mechanisms of indicating and recording instruments of the class referred to, an arrangement of such mechanisms being afforded by the present invention conducive to compactness of construction, accuracy of operation and cheapness of manufacturing as well as reliability in respect to the action of the various parts of the instrument.

With the foregoing and other objects in view, the details of construction of my invention and its operation under practical conditions of service will be comprehended upon reference to the following detailed description in connection with the accompanying drawings in which—

Fig. 2 is a longitudinal sectional view taken about on the line 2—2 of Fig. 3.

Fig. 3 is a transverse sectional view through the instrument taken about on the line 3—3 of Fig. 1.

Fig. 4 is a view similar to Fig. 3 but looking toward the inclosed mechanism from the opposite end of the casing.

Fig. 5 is a fragmentary view of the recording and time indicating tape.

In the practical embodiment of the invention it is contemplated to employ a suitable casing A to receive the various parts of the mechanism by which the indicating and recording instrumentalities of the invention are operated. On this casing A is disposed a register B which may be of any conventional type, such as a Veeder counting register, modified to the extent that certain of the registering wheels are controlled for registering the mileage of trips, and adapted to be zeroized manually by suitable means including the knurled handle 1, see Fig. 1. The indicating numbers on the trip registering wheels may be printed in a color distinguishing the same from the main indicating numbers of the register which latter register the total mileage, all in a manner quite common in the arts.

Figure 1:
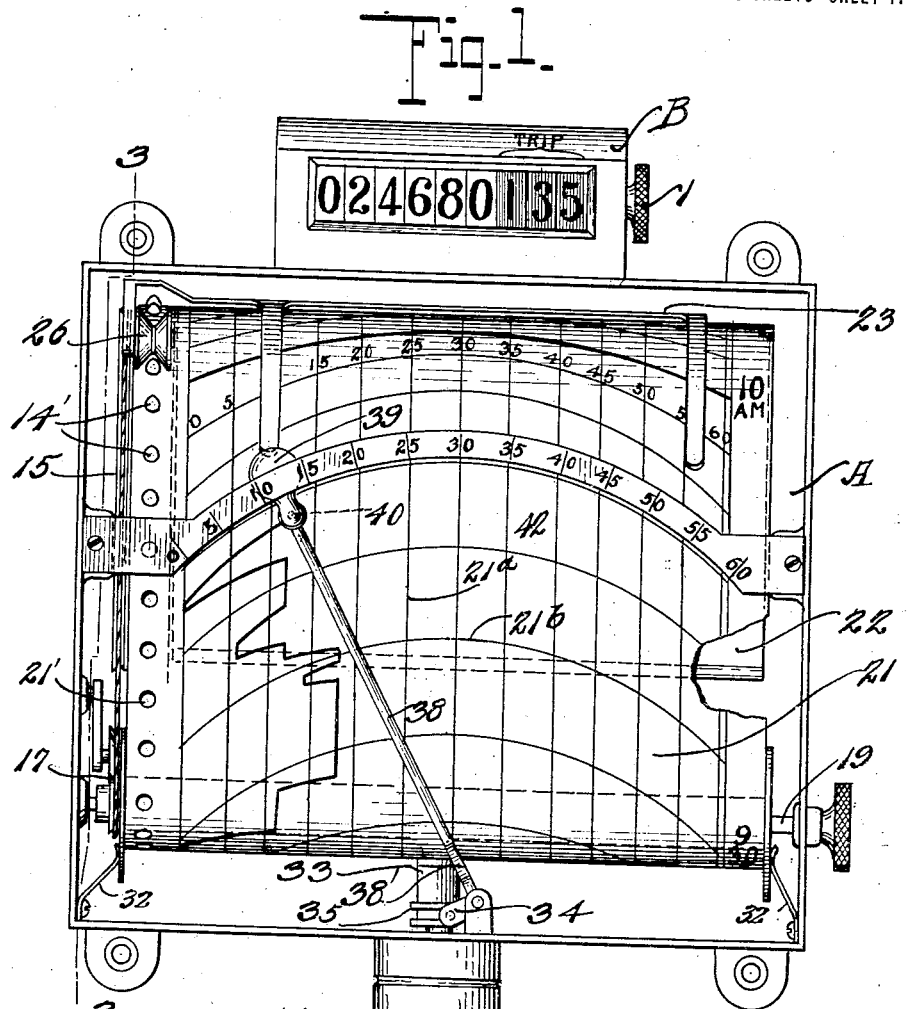
Figure 1 is a front elevation of an indicator and recorder embodying the essential features of the invention, the front closing plate and transparent member providing a window therefor being removed.

The register B as seen in Figs. 1, 3 and 4 especially is adapted to be operated directly from a moving part of the vehicle, ordinarily an automobile, through the provision of a flexible shaft 2 connected with the vertical shaft 3, the upper end of which vertical shaft carries a gear 4 meshing with a gear 5 on the worm shaft 6. The worm 6' on the shaft 6 engages a worm wheel 7 on a transverse shaft 8, which shaft 8 carries a gear 9 or equivalent actuating element directly coöperating with a suitable actuating part disposed in the casing of the register B.

Figure 6:
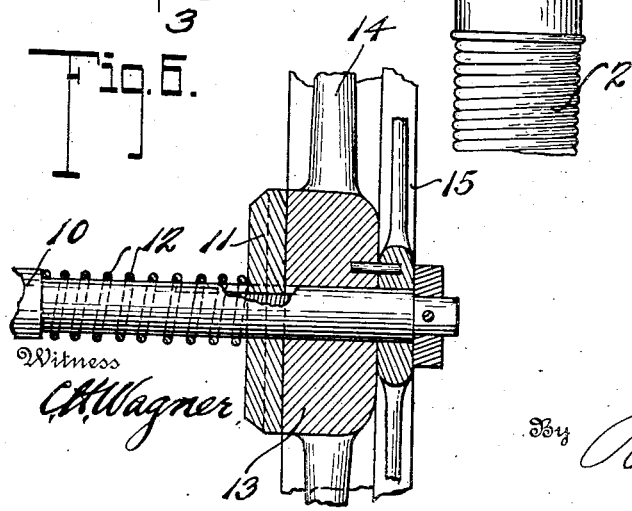
Fig. 6 is a fragmentary sectional view showing more clearly the friction clutch intermediate the motor shaft and the driving wheel by which the recording tape is actuated.
Figure 7:
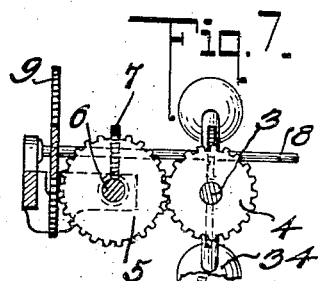
Fig. 7 is a fragmentary sectional view showing the train of gearing between the drive shaft operated according to the speed of the vehicle, and the odometer or registering device.

It is contemplated that any conventional driving connection may be established between the moving part of the vehicle and the register B within the purview of the invention, and the operation of the register B is quite analogous indeed to the ordinary operation of speedometers universally in use. The recording mechanism of the invention involves the provision of a motor C, seen best in Figs. 2 and 4. This motor is preferably of the spring type such as used for clocks and its operation is timed like that of a clock. The motor C has its motor shaft 10 arranged so as to carry a friction clutch disk 11, seen clearly in Fig. 6, which disk 11 is keyed to the shaft and resiliently held by a spring 12 in engagement with the flat side of the hub 13 of the recording tape driving wheel 14. The said driving wheel 14 is loosely mounted upon the shaft 6 but moves ordinarily with the shaft as an incident to the clutching engagement between the parts 11 and 13. Connected to turn with the driving wheel 14 is a large grooved wheel 15 about which passes a belt 16 connecting said wheel with a small grooved wheel 17 carried by a winding reel 18 mounted upon the removable pintle rod 19, seen best in Figs. 1, 2 and 3.

In addition to the winding reel 18 there is provided a supply reel 20, both of these reels being adapted to control by receiving and supplying respectively the recording tape 21 on which is made the permanent record of the speed of operation of the vehicle equipped with the instrument of the invention, and by which record tape also time is indicated owing to the provision on the tape of suitable indicia for this purpose. The recording tape 21 unrolls from the reel 20, passes over a stationary platen 22, see Figs. 3 and 4, and then rolls or winds upon the reel 18. In order that a positive feed of the tape may be effected the driving wheel 14 is provided with projections adapted to enter perforations 21' provided throughout the length of the tape 21. There are utilized also curved resilient fingers 23, curved to conform with and extend over a portion of the surface of the platen 22 whereby to hold the recording tape snugly against the surface of the platen. These fingers 23 are preferably carried by a rocker arm 24 supported at 25 in the casing 1, said arm being equipped at its opposite ends with grooved rollers 26 in the grooves of which the projections 14' on the driving wheel operate during rotation of said wheel. The rollers 26 insure that the perforated portion of the recording tape 21 will be pressed into and remain in proper engagement with the projections of the wheel 14. Owing to the pivotal mounting of the arm 24 which has an extension 24ª projecting rearwardly from the roller 26 thereof, said arm may be raised slightly to disengage the recording tape from the wheel 14 when replacing a new roll of said tape. A spring 27 supported in any suitable manner in the casing engages the extension 24ª of the arm 24 to maintain the rolls of said arm in resilient coöperation with the wheel 14 for the purpose described.

There is also provided a tensioning device for the belt 16, seen best in Fig. 3 as comprising an arm 28 pivotally mounted at 29 and held in engagement with the belt by a resilient member 30 in the form of a spring having an adjustable screw bearing 31 directly engaging said arm 28.

In order that undue looseness of the supply reel 20 in relation to its pintle rod 19 may not exist, and consequent undue slack in the recording tape 21 avoided, friction springs 32 are provided and engage the ends or heads of this reel in an obvious manner.

The mileage registering mechanism having been described and the surface upon which the record is to be made with the operating means for said surface also having been set forth, the marking device coacting with the recording surface will now be detailed.

Reference is made particularly to Figs. 1, 3 and 4. As seen in Fig. 3 there is mounted on the shaft 3 a sleeve 33 movable longitudinally of said shaft. A ball governor 34 connected with the shaft 3 and the sleeve 33 is utilized for raising and lowering the sleeve 33 variably in accordance with the speed of rotation of the shaft 3 and therefore obviously in correspondence with the speed of the vehicle equipped with the invention. The greater the speed of operation of the vehicle the higher the sleeve 33 is moved, and the movement of the sleeve 33 is communicated to a shaft 34 by means of a grooved member 35 at the lower end of the sleeve, which grooved member receives a pin or stud 36 on a crank arm 37 of the shaft 34. Movement of the sleeve 33 will thus impart corresponding movement to the shaft 34 and the shaft 34 carries a marking and indicating device consisting of an arm or pointer 38 at the upper end of which is detachably supported an ink reservoir 39 formed with a marking point 40. The point 40 of the reservoir 39 is formed with a hair-breadth opening through which the marking fluid in the reservoir is fed to the recording tape in contact with which the point 40 is normally disposed. The platen 22 affords a suitable base of sufficient rigidity intermediate which and the point 40 the recording tape operates, and that portion of the platen coacting with the point 40 is substantially vertical, as seen in Fig. 3.

The recording tape 21 is seen best in Fig. 5 and is characterized by the provision at its left hand edge of the perforations 21' previously referred to, and by the provision of longitudinal lines 21ª spaced properly and supplied with indicia representative of speed of movement of the vehicle with which the invention is used. There are also provided on the tape 21 transverse curved lines 21ᵇ representative of intervals of time and the right hand margin of the tape is supplied with time indicia visible to the operator of the machine through the window 1ª at the front of the casing 1. It is preferred that the lines 21ᵇ be spaced apart at five minute intervals, a few in the space being provided between adjacent lines and fifteen minute time periods being marked, or in other words, every fourth line having associated time indicating notations. Owing to the indicia on the tape 21, and its line markings the motor C is designed to move the tape six inches per hour, or one and one-half inches every fifteen minutes. The tape 21 will be preferably made in lengths of one hundred feet so that a roll of the tape should last for approximately eight days. On this account the motor C should preferably be of a type adapted to operate eight days without requiring rewinding or reenergizing of any sort if it be other than a spring motor.

*Operation of the invention.*

It being understood that the motor C is equipped with a suitable winding shaft 41, a moving hand 42 to show that the motor is operating, and a stopping lever 43 whereby the operation of the motor may be discontinued when the indicator and recorder is not to be used, for instance when the vehicle is in storage or put up for repairs, the general operation of the indicating and recording instrumentalities may now be briefly set forth.

The reels 18 and 20 are intended to be used somewhat the same as the corresponding reels used in kodaks or cameras for supplying and winding a film. In other words, said reels are interchangeable, it being desirable that the supply reel 20 be placed on the pintle rod of the take up reel 18 after the tape 21 has been rolled on the latter and removed therewith. Said reels 18 and 20 in fact may have slots therein such as seen in Fig. 2, to facilitate connection of an end of the tape 21 in an obvious way. When the use of the indicating and recording means of the invention is started the tape 21 will be moved by the operation of the handle 19ª of the pintle rod 19 of the take-up reels 18, whereby the tape is positioned with the proper time indicia opposite the pen 40, said time indicia corresponding with the actual time of commencement of use of the recording means.

The movement of the recording tape independently of the motor for the above purpose is obtainable owing to the provision of the clutch parts 11 and 13 which allow a slippage of the driving wheel 14 with respect to the member 11 while said member is fixed or stationary and previous to starting the motor. The above adjustment having been obtained the motor C is started and the operation of the vehicle equipped with the invention from this time on is indicated to the extent of the registration of the mileage by the register B directly actuated from the flexible shaft 2. Likewise movement of the vehicle is indicated in respect to the number of miles at which the machine is driving by the shifting of the pointer 36 forming a part of the marking device, said pointer operating at its upper end opposite a dial plate 42, see Fig. 1, which plate is fixed to the front of the casing A in any suitable manner.

The mileage markings on the dial plate 42 correspond somewhat with the similar markings on the recording tape. In addition to the foregoing action the recording tape 21 continues to move as soon as the motor C starts to operate and is not intended to stop in its movement unless by authorized operation of the lever 43 and only when the vehicle is put out of service temporarily. On this account the operation of the marking device including the pen 40 will furnish on the tape an accurate record of the operation of the machine as well as the time during which it is not operated, with the customary resultant advantages. The pointer 38 of the marking device is flattened at its lower end as seen at 38' whereby to provide a resilient or spring element tending to resiliently hold the pen 40 against the tape 21. The manner in which the marking device is adapted to traverse the tape 21 laterally and produce upon the surface of the tape in predetermined relation to its longitudinal and transverse lines of marking the record of the operation of the machine, is graphically shown in Fig. 1.

I do not wish to be restricted to the exact details of construction illustrated in the drawings of my invention for it is obvious that various changes may be made in the general arrangement and detail formation of parts without departing from the spirit of the invention and within the purview of the aftergoing claims.

Having thus described the invention, what is claimed as new is:—

1. In an instrument of the class described, the combination of driving means operable at various speeds, recording mechanism including a recording tape, a reel about which said tape is adapted to wind, a motor, a driving wheel connected with said reel for moving the same, a clutch connecting the motor with said driving wheel whereby to operate the recording tape, a marking device coacting with the recording tape, means for adjusting the recording tape independently of the motor for setting the tape properly in respect to the marking device, said driving wheel being provided with projections engageable with the recording tape, and resiliently actuated means coacting with the driving wheel to hold said tape engaged with the projections of the wheel.

2. In an instrument of the class described, the combination of driving means operable at various speeds, recording mechanism including a recording tape, a reel about which said tape is adapted to wind, a motor, a driving wheel connected with said reel for moving the same, a clutch connecting the motor with said driving wheel whereby to operate the recording tape, a marking device coacting with the recording tape, means for adjusting the recording tape independently of the motor for setting the tape properly in respect to the marking device, said driving wheel being provided with projections engageable with the recording tape, a rocking arm coacting with the driving wheel, rollers carried by said arm engageable with the tape to hold the latter engaged with the projections on the driving wheel, a platen over which said tape passes, and pressure fingers carried by said rocking arm and coacting with the recording tape to hold the latter in proper relation with respect to said platen.

In testimony whereof I affix my signature.

HARRY A. LANDIS.